(12) United States Patent  (10) Patent No.: US 7,503,342 B2
Piehl et al.  (45) Date of Patent: Mar. 17, 2009

(54) PROPORTIONAL DIRECTIONAL CONTROL VALVE WITH A MAGNETIC POSITIONING SENSOR

(75) Inventors: Travis Raymond Piehl, Victoria, MN (US); Kermit Anthony Wold, Plymouth, MN (US)

(73) Assignee: Continental Hydraulics, Savage, MN (US)

( * ) Notice: Subject to any disclaimer, the term of this patent is extended or adjusted under 35 U.S.C. 154(b) by 597 days.

(21) Appl. No.: 11/364,259

(22) Filed: Feb. 28, 2006

(65) Prior Publication Data

US 2006/0145112 A1 Jul. 6, 2006

Related U.S. Application Data

(63) Continuation-in-part of application No. 10/735,185, filed on Dec. 12, 2003, now Pat. No. 7,070,161.

(60) Provisional application No. 60/501,944, filed on Sep. 11, 2003.

(51) Int. Cl.
 *F16K 31/02* (2006.01)
(52) U.S. Cl. ............. 137/554; 137/625.64; 251/129.04; 251/129.08; 335/306
(58) Field of Classification Search ............ 251/129.04, 251/129.08, 129.15; 335/306; 137/554, 137/625.64, 625.65
See application file for complete search history.

(56) References Cited

U.S. PATENT DOCUMENTS

| 4,121,610 A | | 10/1978 | Harms et al. ........... 137/115.05 |
| 4,310,143 A | * | 1/1982 | Determan ............... 137/625.64 |
| 4,526,201 A | | 7/1985 | Geyler, Jr. et al. |
| 4,970,941 A | | 11/1990 | Reinhardt |
| 5,101,856 A | * | 4/1992 | Kakinuma et al. .......... 137/554 |
| 5,197,508 A | | 3/1993 | Gottling et al. ................. 137/1 |
| 5,538,220 A | | 7/1996 | LaMarca ............... 251/129.15 |
| 5,787,915 A | * | 8/1998 | Byers et al. ............ 251/129.04 |
| 5,806,565 A | | 9/1998 | Kadlicko |
| 6,152,172 A | * | 11/2000 | Christianson et al. ....... 137/554 |
| 6,178,956 B1 | | 1/2001 | Seinmann et al. ...... 123/568.21 |
| 6,182,942 B1 | * | 2/2001 | Kadlicko ............... 251/129.15 |
| 6,283,149 B1 | * | 9/2001 | Hayashi et al. ............. 137/554 |
| 6,536,469 B2 | * | 3/2003 | Dilger et al. ................. 137/554 |
| 6,612,333 B2 | * | 9/2003 | Miyazoe et al. ............. 137/554 |
| 2003/0188303 A1 | | 10/2003 | Barman et al. ............... 717/170 |
| 2004/0189284 A1 | * | 9/2004 | Haubold et al. .......... 324/207.2 |

* cited by examiner

*Primary Examiner*—John Bastianelli
(74) *Attorney, Agent, or Firm*—Barnes & Thornburg LLP

(57) ABSTRACT

A proportional directional control valve having a linearly movable valve element, a magnetic assembly operatively connected to the valve element where the magnetic assembly provides a magnetic field responsive to the linear motion of the valve element, a linear Hall-effect sensor assembly configured to generate an electrical signal responsive to a change in the magnetic field, and a control system that controls the linear movement of the valve element in response to a comparison of the electrical signal and a command electrical input signal. The magnetic assembly includes a non-magnetic housing defining an axial passageway, first and second magnets disposed in the passageway, first and second magnetic pole pieces disposed be in the passageway between the first and second magnets, and a non-magnetic spacer disposed in the passageway between the first and second magnets and between the first and second magnetic pole pieces.

25 Claims, 10 Drawing Sheets

VALVE SETUP

MACHINE / VALVE ID
[          ]

COIL VOLTAGE ○12VOLT ●24VOLT

COMMAND INPUT
● +/−10v
○ +/−5v
○ 4−20mA

A SOLENOID ☐ ON
B SOLENOID ☐ ON

---

NULL
A SOLENOID [    ]mA [+][−]
B SOLENOID [    ]mA [+][−]

---

GAIN
A SOLENOID [    ]mA [+][−]
B SOLENOID [    ]mA [+][−]

---

ACCEL
A SOLENOID [    ]SEC [+][−]
B SOLENOID [    ]SEC [+][−]

---

DECEL
A SOLENOID [    ]SEC [+][−]
B SOLENOID [    ]SEC [+][−]

---

DITHER (0−360Hz)
[    ]Hz [+][−]

---

SET ALL VALUES BEFORE WRITE

[WRITE]

PROPORTIONAL DIRECTIONAL CONTROL VALVE WITH A MAGNETIC POSITIONING SENSOR

CROSS-REFERENCE TO RELATED APPLICATIONS

This application is a continuation-in-part application of U.S. patent application Ser. No. 10/735,185, filed Dec. 12, 2003 now U.S. Pat. No. 7,070,161 of the same title, which claims priority under 35 U.S.C. section 119(e) from U.S. Provisional Patent Application No. 60/501,944, filed Sep. 11, 2003 of the same title.

FIELD OF THE INVENTION

This present disclosure is directed to proportional control valves, and more particularly, to a proportional directional control valve with a magnetic positioning sensor.

BACKGROUND

Use of proportional control valves is widespread in many industries. For example, a proportional control valve may be used to control a position of a machine tool such as a saw requiring accurate positioning and repeatability of that position within a small tolerance. Proportional control valves may also be used in applications where speed control may be required, for example, to maintain a precise speed of a web traveling through a printing press having varying roll sizes. Similarly, proportional control valves may be used in applications requiring force or pressure control such as pressure control for cylinders being utilized to lift or hold a load.

SUMMARY

The present disclosure relates to a proportional directional control valve comprising a housing having a first portion and a second portion, the first portion having an interior chamber; an electronic controller mounted within the interior chamber; at least one solenoid assembly electrically coupled to the electronic controller, the solenoid assembly disposed in the second portion, a drive pin of the solenoid assembly being reciprocally moveable responsive to a current provided by the electronic controller; a valve assembly disposed in the second portion, the valve assembly comprising a linearly moveable valve element operatively connected to the solenoid assembly, a position of the valve element being responsive to a position of the drive pin; a magnetic assembly operatively connected to the valve element, the magnetic assembly providing a magnetic field responsive to the position of the valve element; and a magnetic positioning sensor assembly coupled to the electronic controller, the magnetic positioning sensor detecting a change in the magnetic field, the magnetic positioning sensor assembly generating an output voltage proportional to the change in the magnetic field.

The magnetic assembly may include a non-magnetic housing having a passageway extending axially through a portion of the non-magnetic housing, first and second magnets disposed in the passageway, and a pair of magnetic pole pieces disposed between the first and second magnets. The magnetic pole pieces may comprise ferrous or any other suitable material.

The present disclosure may include other features disclosed herein.

BRIEF DESCRIPTION OF THE DRAWINGS

FIGS. 8-9 are an exemplary screen shot that may be displayed on a computer display screen coupled to the proportional directional control valve of FIG. 1.

DESCRIPTION OF THE PREFERRED EXAMPLES

Figure 1:
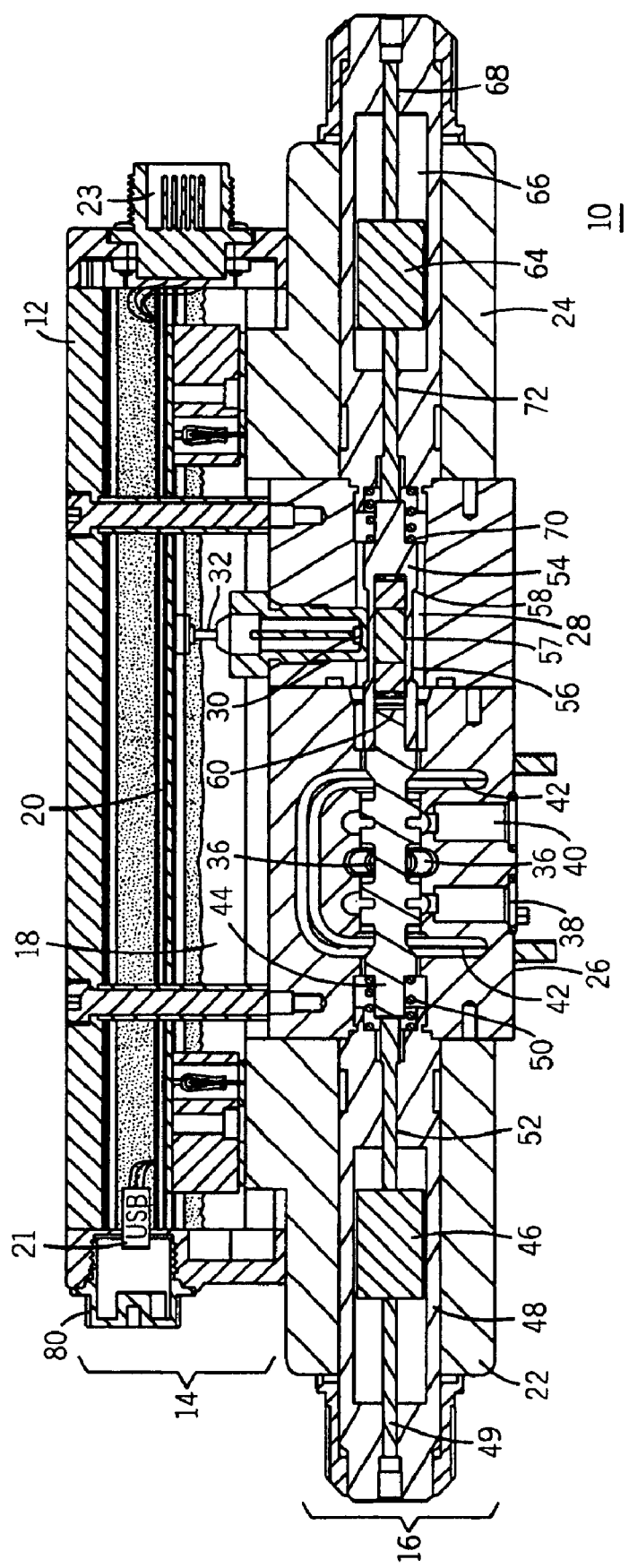
FIG. 1 is a cross sectional view of the proportional directional control valve with a magnetic positioning sensor in accordance with an embodiment of the present disclosure.

The description of the preferred examples is to be construed as exemplary only and does not describe every possible embodiment of the present disclosure. Numerous alternative embodiments could be implemented, using either current technology or technology developed after the filing date of this patent, which would still fall within the scope of the claims.

A proportional directional control valve with a magnetic positioning sensor is disclosed herein. In a preferred embodiment, the magnetic positioning sensor includes a linear Hall-effect sensor. Stated generally, the proportional directional control valve includes (a) a valve operating mechanism that permits communication between a first and a second channel through a linear motion of a valve element of the valve operating mechanism, (b) a magnetic assembly operatively connected to the valve element where a magnetic field of the magnetic assembly is responsive to the linear motion of the valve element, (c) a magnetic positioning sensor assembly configured to generate an output electrical signal (e.g., an output voltage) responsive to a change in the magnetic field, and (d) a control system that controls the linear movement of the valve element in response to the electrical signal. The valve operating mechanism includes a solenoid assembly and valve assembly configured with a chamber having the first and second channel disposed therein. A source of fluid is selectively connected to the first channel. The linear motion of the valve element within the chamber of the valve assembly allows the fluid from the source to be selectively received by the first channel and to be selectively conveyed from the second channel.

The control system may include an on-board electronic controller having a microprocessor and memory that controls the linear movement of a drive pin of the solenoid assembly in response to receipt of the output electrical signal from the Hall-effect sensor which is compared by the microprocessor to a command electrical input signal to produce the correct current to drive the solenoid(s). (i.e., in response to receipt of an output voltage directly proportional to the change in the magnetic field). The drive pin is moveably coupled to the valve element. The electronic controller converts the electrical signal into an associated current. The current causes linear motion, or movement, of the drive pin of the solenoid assembly coupled to the electronic controller, thereby changing a position of the valve element and the magnetic assembly. The change in the position of the valve element alters the fluid flow out of the second channel. The change in the position of the magnetic assembly generates a magnetic field responsive to the linear motion of the valve element, and an associated new electrical signal is transmitted by the linear Hall-effect sensor to the electronic controller. Accordingly, precise position control, velocity control, speed control, force control or pressure control is provided to an apparatus coupled to the second channel of the proportional directional control valve with a magnetic positioning sensor.

The proportional directional control valve having a linear Hall-effect sensor in accordance with the present disclosure may provide substantial cost savings over prior art proportional directional control valves utilizing other types of valve element positioning sensors. For example, a typical linear Hall-effect sensor utilizing changes in a magnetic field to detect a valve element position change is ten times less costly than an LVDT utilizing changes in an inductance to detect a similar valve element position change.

With the proportional directional control valve having a linear Hall-effect sensor in accordance with the present disclosure, the on-board electronic controller, when coupled to another computer via one of any number of connecting protocols, can be easily programmed to set-up operational parameters of the proportional directional control valve, thereby precluding the need for manual pot adjustments and manual jumper reconfigurations for set-up and control of the proportional control valve.

FIG. 1 is a cross-sectional view of an embodiment of a proportional directional control valve 10 in accordance with the present disclosure. Referring to FIG. 1, the proportional directional control valve 10 includes a housing 12 having a first portion 14 with an interior chamber 18, and a second portion 16. The first housing portion 14 preferably comprises an extruded aluminum material. An electronic controller 20, preferably a microcontroller having a processor and a memory, is mounted within the interior chamber 18 of the first housing portion 14. An operator interface port 21 such as a universal serial bus (USB) port or DB9 is coupled to the electronic controller 20 at a first end of the first housing portion 14 and a main connector 23 is coupled to the electronic controller 20 at a second end of the first housing portion 14. Although the operator interface port 21 and the main connector 23 are located at opposite ends of the first housing portion 14 in the illustrated example, it is contemplated that they may be located in other suitable locations of the proportional directional control valve 10.

Figure 2:
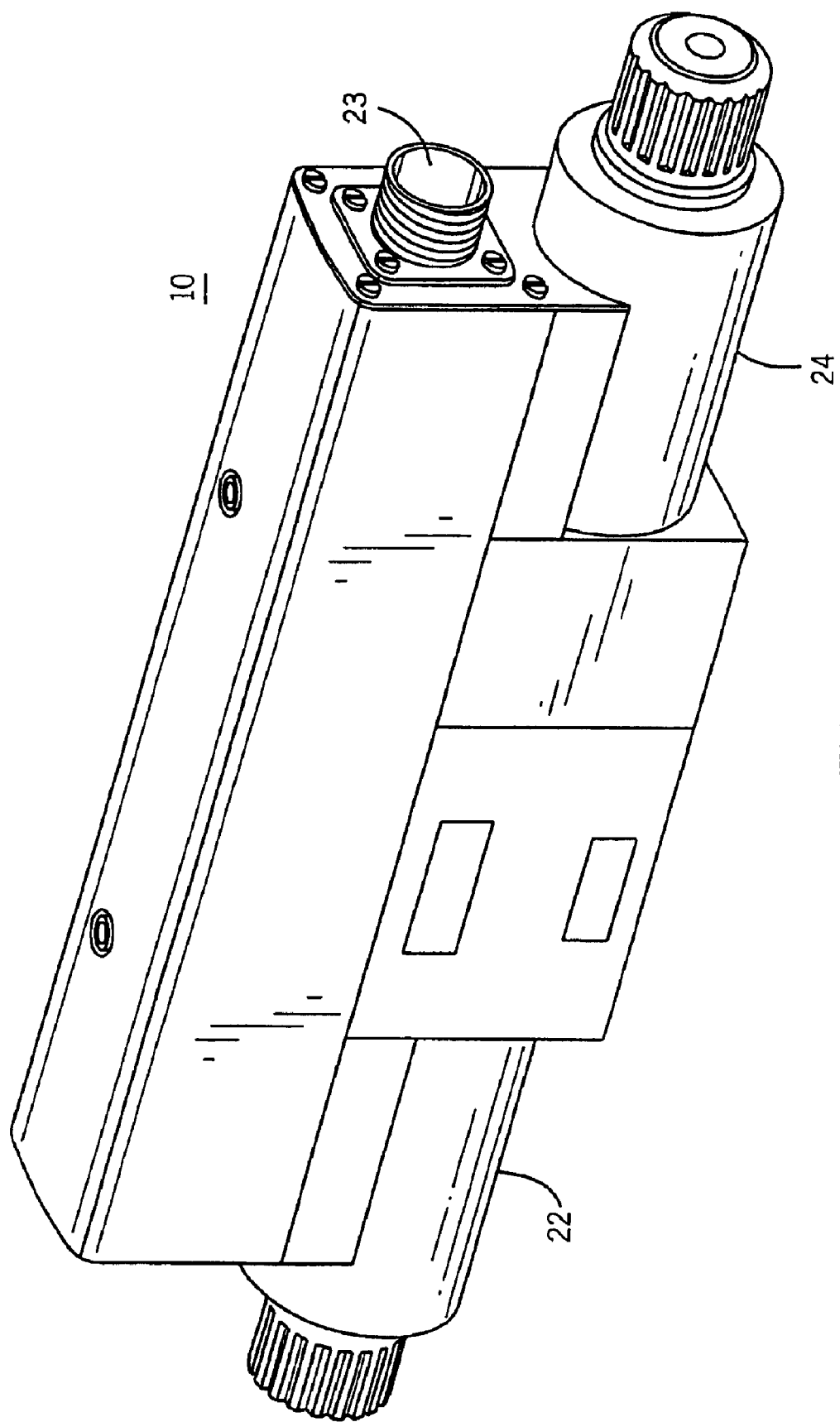
FIG. 2 is an isometric view of the proportional directional control valve of FIG. 1.

A first and second solenoid assembly 22, 24 electrically coupled to the electronic controller 20 via their respective field windings, a valve assembly 26 operatively coupled to the first and second solenoid assembly 22, 24, and a magnetic assembly 28 moveably connected to the valve assembly 26, are disposed in the second housing portion 16. A magnetic positioning sensor assembly 30, also disposed in the second housing portion 16, is coupled to the electronic controller 20 via a coupling connector 32. FIG. 2 is an isometric view of the proportional directional control valve 10 illustrated in FIG. 1.

Figure 3:
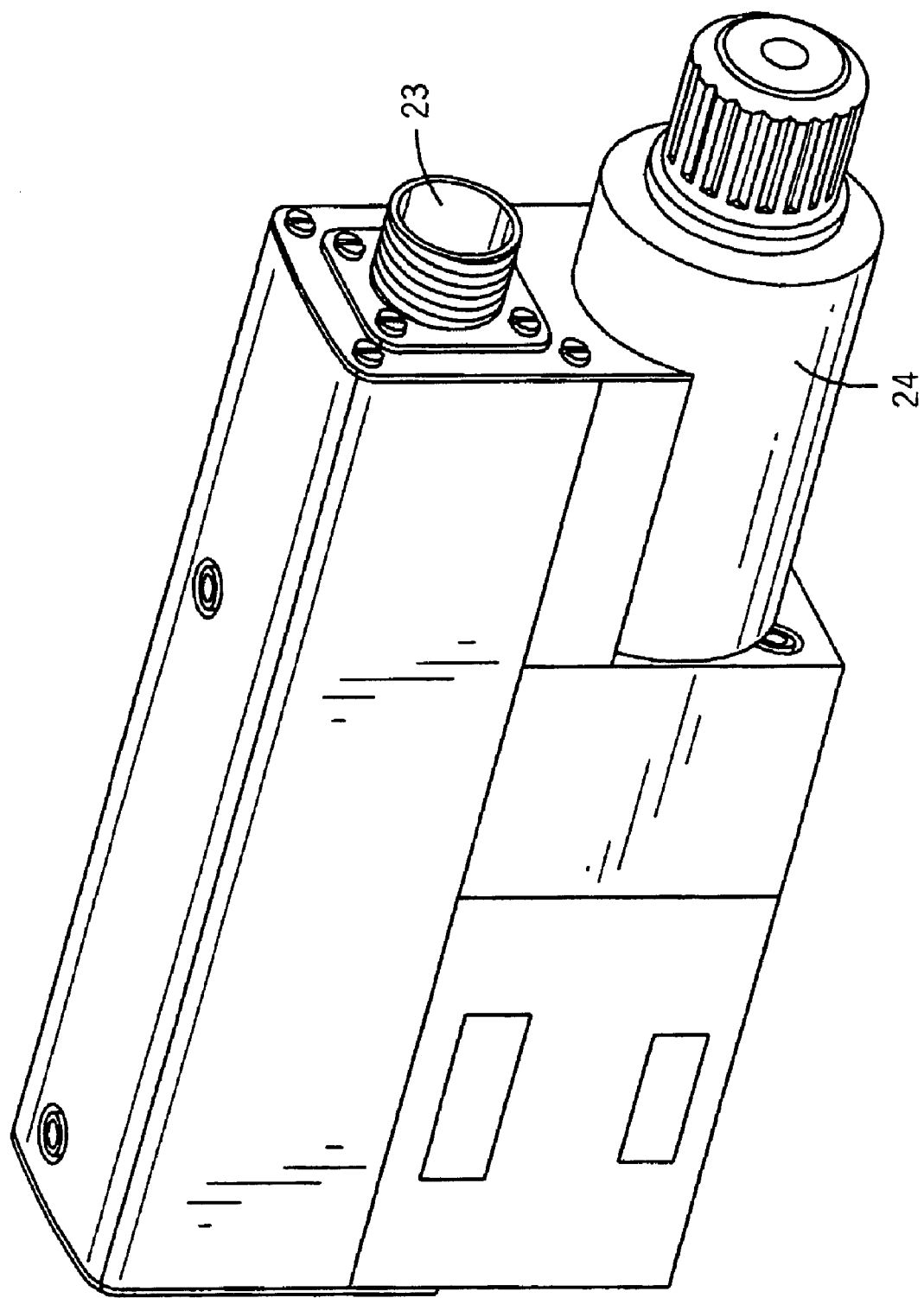
FIG. 3 is an isometric view of a proportional directional control valve with a magnetic positioning sensor in accordance with another embodiment of the present disclosure.

Although the first and second solenoid assembly 22, 24 are illustrated in FIG. 1, it is contemplated that the proportional directional control valve 10 may include only one solenoid assembly 22 (see, FIG. 3), depending on the application for which the proportional directional control valve 10 is being used.

Figure 4:
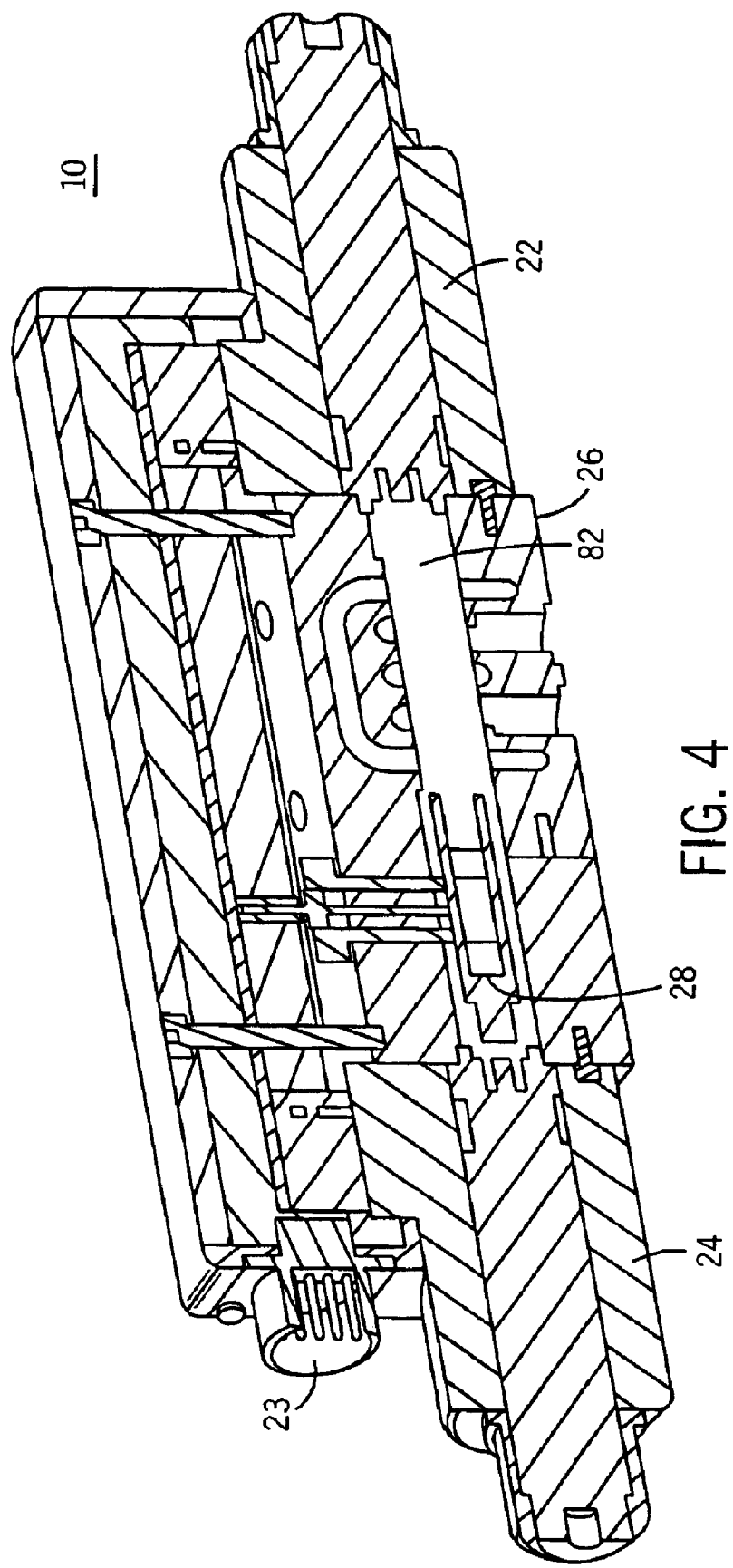
FIG. 4 is a cut away view of the proportional directional control valve of FIG. 1.

FIG. 4 is a cut away view of the proportional directional control valve 10. As illustrated in FIGS. 1 and 4, a chamber 82 is axially disposed in the valve assembly 26. The chamber has one input channel 36 coupled to a source of fluid (not separately illustrated), a first and second output channel 38, 40 to selectively convey fluid from the chamber, and a fluid reservoir 42. The fluid conveyed from the first and/or second output channel(s) 38, 40, is used to provide position control, velocity or speed control, force or pressure control, etc., depending on the required application. A position of a valve element 44, linearly moveable within the chamber of the valve assembly 26, determines the amount of fluid conveyed from the first and/or second output channel(s) 38, 40. For example, in a first position of the valve element 44, fluid from the source may be conveyed from the input channel 36 to the first output channel 38, while in a second position of the valve element 44, fluid from the source may be prevented from flowing to either the first or second output channels 38, 40.

Although illustrated as a valve spool, it is contemplated that the valve element 44 may be any suitable valve element configured to operate in conjunction with the fluid channels and reservoir of the valve assembly 26 or configured to operate in conjunction with a variety connected loads (e.g., cylinder loads of an apparatus coupled to the proportional directional control valve 10) and their associated of flow rates. In addition, although configured with one input channel 36 and two output channels 38, 40, it is contemplated that any suitable configuration of input channel(s) and output channel(s) may be utilized in the valve assembly 26.

Referring again to FIG. 1, the first solenoid assembly 22 includes a first solenoid armature 46 having a coil (not separately illustrated) disposed thereon. The first armature 46 is linearly moveable within a field winding 48 in response to a current provided by the electronic controller 20. The first solenoid assembly 22 also includes a first biasing pin 49 positioned between a first end of the first solenoid assembly 22 and a first end of the solenoid armature 46, and a first drive pin 52 fixedly coupled to a second end of the first solenoid armature 46 and operatively coupled to first end of the valve element 44. A first biasing spring 50 disposed on the first drive pin 52 is also included. Therefore, the first biasing pin 49, the first armature 46, and the first drive pin 52, together, are reciprocally moveable responsive to the current provided by the electronic controller 20. Further, when the current from the electronic controller 20 is applied to the field windings of the first solenoid assembly 22, the first drive pin 52 causes the valve element 44 to move to a new position, thereby increasing or decreasing the fluid flowing from the first and/or second output channels 38, 40. Thus, when the first solenoid armature 46 exerts a force greater then a predetermined force on the valve element 44, the first biasing spring 50 disengages from the first biasing pin 49 via a first mechanical stop (not separately illustrated) thereby allowing only the force greater than the predetermined force to engage the valve element 44.

As previously mentioned, the magnetic assembly 28 is moveably connected to the valve assembly 26. Specifically, as illustrated in FIG. 1, a second end of the valve element 44 is connected to a first end of the magnetic assembly 28 such that linear movement of the valve element 44 causes equal linear movement of the magnetic assembly 28, and vice versa.

Figure 5:
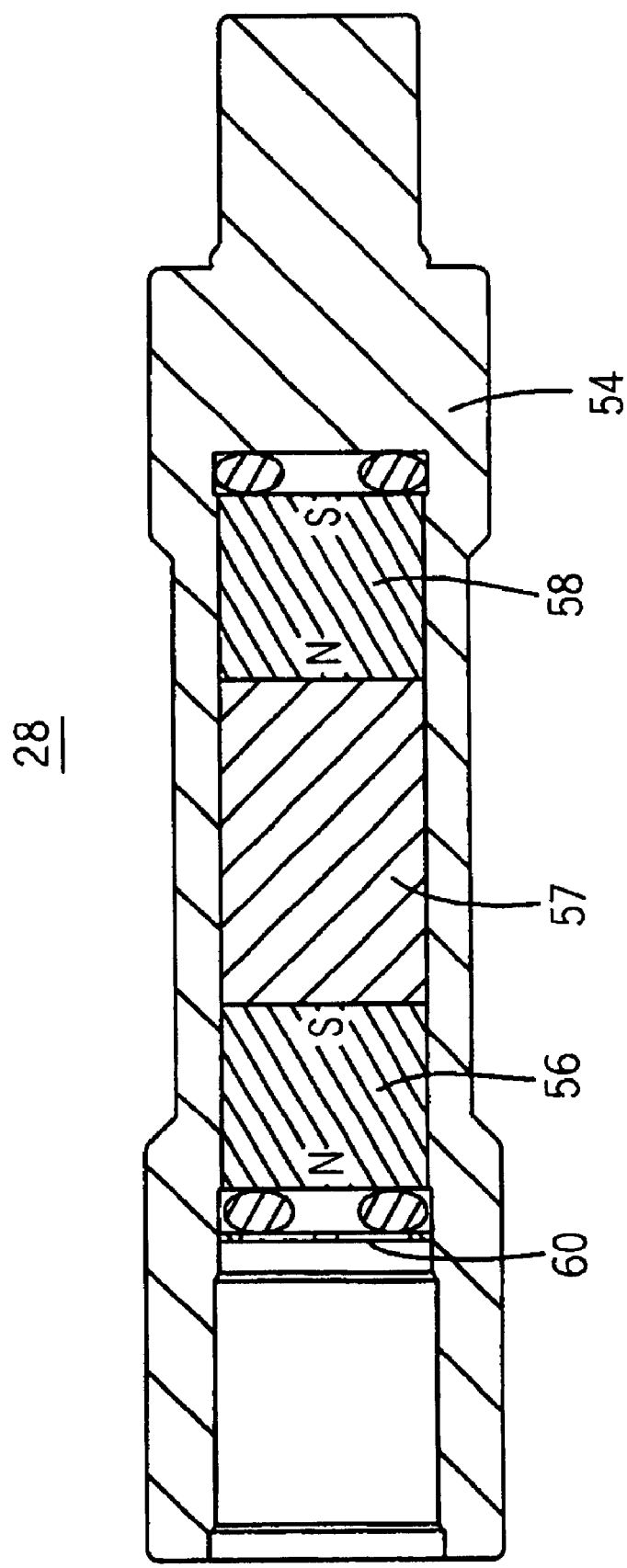
FIG. 5 is a more detailed cross-sectional view of a magnetic assembly of the proportional directional control valve of FIG. 1.

FIG. 5 is a more detailed cross-sectional view of the magnetic assembly 28 illustrated in FIG. 1. The magnetic assembly 28 includes a non-magnetic housing 54 having a passageway extending axially through a portion of the non-magnetic housing. Although preferably made of a beryllium copper material, the non-magnetic housing 54 may be made of one of any number of suitable non-magnetic materials such as, for example, aluminum, stainless steel, or titanium.

A first magnet 56 is located in the first end of the passageway and a second magnet 58 is located in a second end of the passageway. The first and second magnets 56, 58 are preferably made of a samarium cobalt material. Although the south pole of the second magnet 58 is separated from a north pole of the first magnet 56 by a non-magnetic spacer 57 in the passageway, the first and second magnets 56, 58 may be configured in any manner with pole opposing each other. A retaining ring 60 holds the first and second magnets 56, 58 and the non-magnetic spacer 57 in a fixed position. Optional O-rings may also be included to center the first and second magnets 56, 58, thereby absorbing tolerance build up of individual components of the magnetic assembly 28.

Referring again to FIG. 1, the second solenoid assembly 24 includes a second solenoid armature 64 having a coil (not separately illustrated) disposed thereon. The second solenoid armature 64 is linearly moveable within a second field winding 66 in response to the current provided by the electronic controller 20. The second solenoid assembly 24 also includes a second biasing pin 68 positioned between a first end of the second solenoid assembly 24 and a second end of the second solenoid armature 64, and a second drive pin 72 fixedly coupled to a first end of the solenoid armature 64 and operatively coupled to a second end of the valve element 44. A second biasing spring 70 disposed on the second drive pin 72 is also included. Therefore, the second biasing pin 68, the second armature 64, and the second drive pin 72, together, are reciprocally moveable responsive to the current provided by the electronic controller 20. Further, when the current from the controller 20 is applied to the field windings of the second solenoid assembly 24, the second drive pin 72 causes the magnetic assembly 28 and therefore the valve element 44 to move to a new position, thereby increasing or decreasing the fluid flowing from the first and/or second output channels 38, 40. Thus, when the second solenoid armature 64 exerts a force greater than a predetermined force on the valve element 44 (by way of the magnetic assembly 28), the second biasing spring 70 disengages from the second biasing pin 68 via a second mechanical stop (not separately illustrated) thereby allowing only the force greater than the predetermined force to engage the valve element 44.

Figure 6:
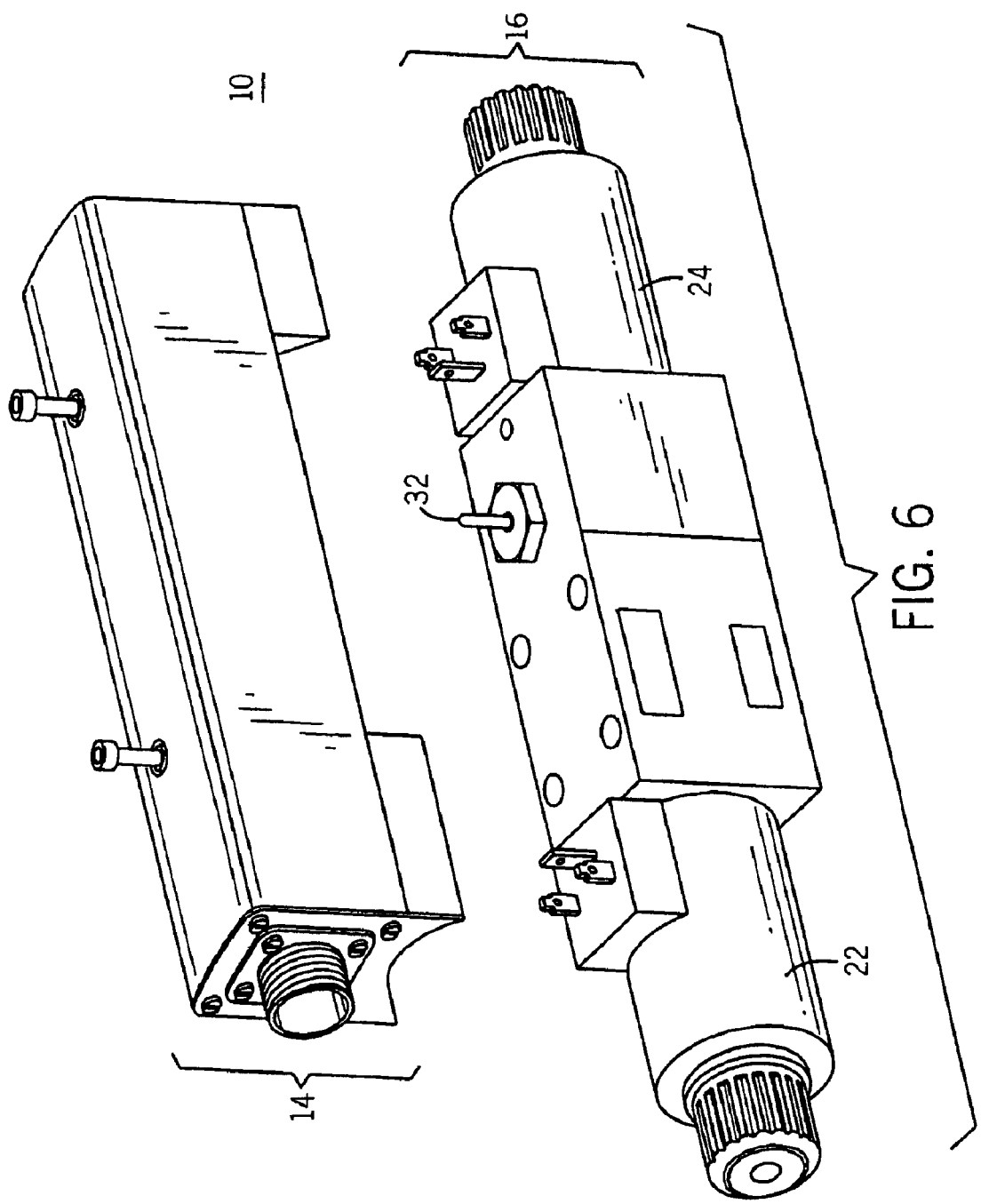
FIG. 6 is another isometric view of the proportional directional control valve of FIG. 1.

As previously mention, a magnetic positioning sensor 30 is coupled to the electronic controller 20 via the coupling connector 32. FIG. 6 is another isometric view of the proportional directional control valve 10. As illustrated in FIG. 6, the coupling connector 32 enables the connection between the magnetic positioning sensor 30 and the electronic controller 20 when the second housing portion 16 is mated to the first housing portion 14. The coupling connector 32 preferably comprises a pinned terminal connector configured to transmit a magnetic positioning sensor output (i.e., an output voltage) to the electronic controller 20 however other suitable coupling connectors (e.g., a small stereo pin or triaxial connector having a supply voltage input, a ground input and the magnetic positioning sensor output) may be utilized. In the illustrated example, the magnetic positioning sensor 30 preferably comprises a linear Hall-effect sensor such as the Ratiometric Linear Hall-Effect Sensor for High-Temperature Operation manufactured by Allegro Micro Systems, Inc., however other magnetic positioning sensors may be utilized.

Prior to operation of the proportional directional control valve 10, the magnetic positioning sensor 30, in this case a linear Hall-effect sensor, is calibrated in order to enable the electronic controller 20 to command operation of the first and second solenoid assemblies 22, 24 and therefore, shifting of the valve element 44. Calibration ensures proper tracking with a known command electrical signal received via the operator interface port 21. For example, if a command electrical signal is used to generate a +/−10 volt to command a shift in the valve, at 0 volts the valve element 44 is centered, at +10 volts the second solenoid assembly 24 is fully shifted and at −10 volts the first solenoid assembly 22 is fully shifted in an opposite direction. Calibration of the magnetic positioning sensor 30 therefore includes aligning magnetic positioning sensor 30 output voltages associated with a centered valve element 44, a full shift of the second solenoid assembly 24 and a full shift of the first solenoid assembly 22 with known command electrical signal values.

During operation of the proportional directional control valve 10, the magnetic positioning sensor 30 detects changes in the magnetic field resulting from the magnetic assembly 28 as the magnetic assembly 28 moves linearly with the valve element 44. At discrete time intervals, an output voltage proportional to a change in the magnetic field is generated by the linear Hall-effect sensor. The magnetic positioning sensor output voltage, received by the electronic controller 20, is then compared with the command electrical input signal to form an adjusting signal used to alter the current used to drive the first or second solenoid assembly 22, 24. In this way, the position of the valve element 44 can be adjusted, detected and utilized in a "feedback control" scheme to control fluid flow into and out of the valve assembly 26, thereby enabling precise position control, velocity or speed control, or force or pressure control.

Figure 7:
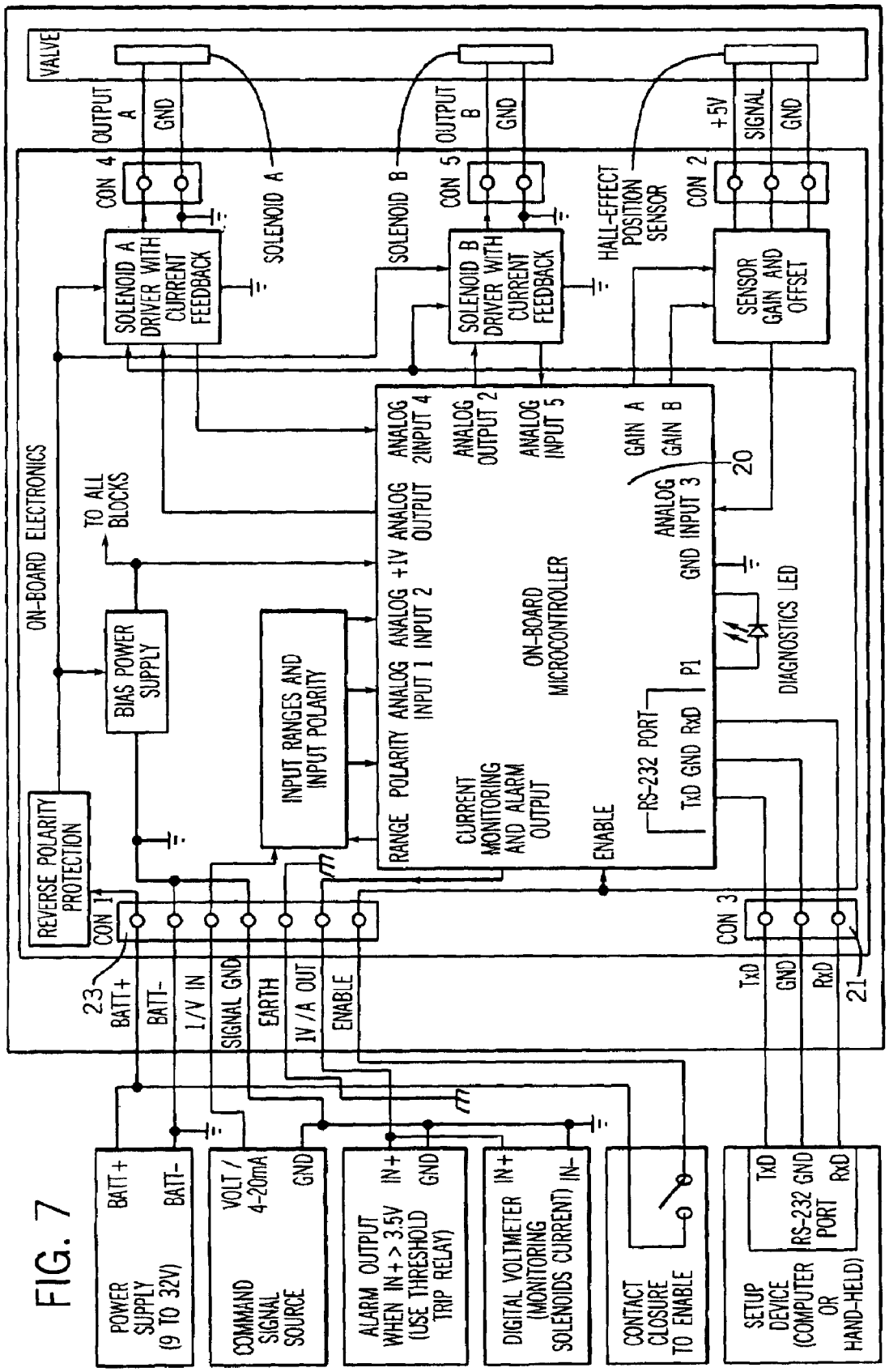
FIG. 7 is an electrical schematic diagram of the proportional directional control valve of FIG. 1.

The main connector 23 is preferably coupled to the electronic controller 20 at a second end of the first portion 14 of the housing. As illustrated by the schematic diagram of FIG. 7, the main connector 23 includes seven pins and is configured (1) to receive electrical power (e.g., 9 to 32 volts) and then to provide the electrical power to the electronic controller 20 and other components of the proportional directional control valve 10, (2) to receive a command signal (e.g., +/−5 volts, +/−10 volts, 4-20 mA), the command signal being processed by the electronic controller to drive the solenoid assembly, (3) to provide an alarm output signal equal to an input power to power relay or lamp when open load is detected, (4) to enable the current to the solenoid assemblies 22, 24 to be monitored, and (5) to enable overall operation of the proportional directional control valve 10 (e.g., contact closure to enable overall operation).

The operator interface port 21 is coupled to the electronic controller 20 to enable operator set-up of the operating parameters for the proportional directional control valve 10. In addition, an optional removable protective cap 80 may be included to protect the operator interface port 21 from dust and other contaminants while allowing operator access to the operator interface port 21 during parameter set-up. Although preferably located at the first end of the first portion 14, the operator interface port 21 and the removable protective cover 80 may be located in any suitable location of the proportional directional control valve 10.

Use of the operator interface port 21 enables communication between the electronic controller 20 and an appropriate communicating device coupled to the operator interface port 21. For example, the communicating devices may include personal computers (e.g., laptop, tablet, desktop computers) and handheld computers such as PDA's, communicating with the electronic controller 20 via a USB port, an RS-232 port, etc. Similarly, the communicating devices may include wireless devices such as mobile computers or mobile telephones, communicating with the electronic controller 20 via an IEEE 802.11 wireless transceiver, a Bluetooth™ wireless transceiver, a mobile station transceiver such as a code division multiple access mobile (CDMA) transceiver, to name a few.

Figure 9:

Using the operator interface port 21 and an appropriate communicating device, an operator may configure parameters of the proportional directional control valve 10 to operate at within predetermined ranges. The operating parameters may include for example, a solenoid coil voltage, a command input voltage or a command input current, solenoid enable switch, a first ("A") and/or second ("B") solenoid null parameter, a first and/or second solenoid gain parameter, a first and/or second solenoid acceleration parameter, a first and/or second solenoid deceleration parameter, a dither frequency parameter and a first and/or second solenoid dither amplitude parameter. For example, utilizing a laptop computer operatively connected to the operator interface port 21, an operator may set-up the proportional directional control valve 10 with an operating coil voltage of 24 volts, a command voltage input of +/−10 volts, solenoid enable, a solenoid A and/or B null parameter of 0 to 1.000 amp, a solenoid A and/or B gain parameter of 0 to 2.500 amps, a solenoid A and/or B acceleration parameter of 0 to 30 seconds, a solenoid A and/or B deceleration parameter of 0 to 30 seconds, a dither frequency parameter of 0 to 360 Hz, and a solenoid A and/or B dither amplitude of 0 to 20%. FIGS. 8-9 illustrate an exemplary screen shot that may be displayed on a computer display screen coupled to the operator interface port 21 during parameter configuration of the proportional directional control valve 10.

In addition, the electronic controller 20 is mounted to an electronic board in the interior chamber 18 of the first housing portion 14. The electronic board, including the electronic controller 20 and associated electronics, is surrounded by an electronic potting material (e.g., a silicon material) to provide a protective barrier against dust, fluids and other contaminants. Similarly, the potting material is also disposed on an interior portion of the main connector 23, an interior portion of the coupling connector 23 and an interior portion of the operator interface port 21.

As may be apparent from the discussion above, the "on-board" mounting of the electronic controller 20 and associated electronics in the first housing portion 14 enables the first housing portion 14 to be easily separated from the second housing portion 16 for maintenance purposes (see, FIG. 6). The on-board mounting of the electronic controller 20 and associated electronics also precludes the need for manual pot adjustments and manual jumper reconfigurations currently required for prior art proportional control valves having remotely located electronics. Further, use of the on-board electronic controller 20 and associated electronics enables self-teaching proportional-integral-derivative (PID) control of the proportional directional control valve 10.

As may also be apparent form the discussion above, use of the linear Hall-effect sensor for detecting a change in the magnetic field by linear movement of the magnetic positioning sensor assembly 30 responsive to linear movement of the valve element 44, decreases the cost of the proportional directional control valve 10 as compared to other proportional directional control valves using other linear positioning sensing devices such as the LVDT.

Figure 10:
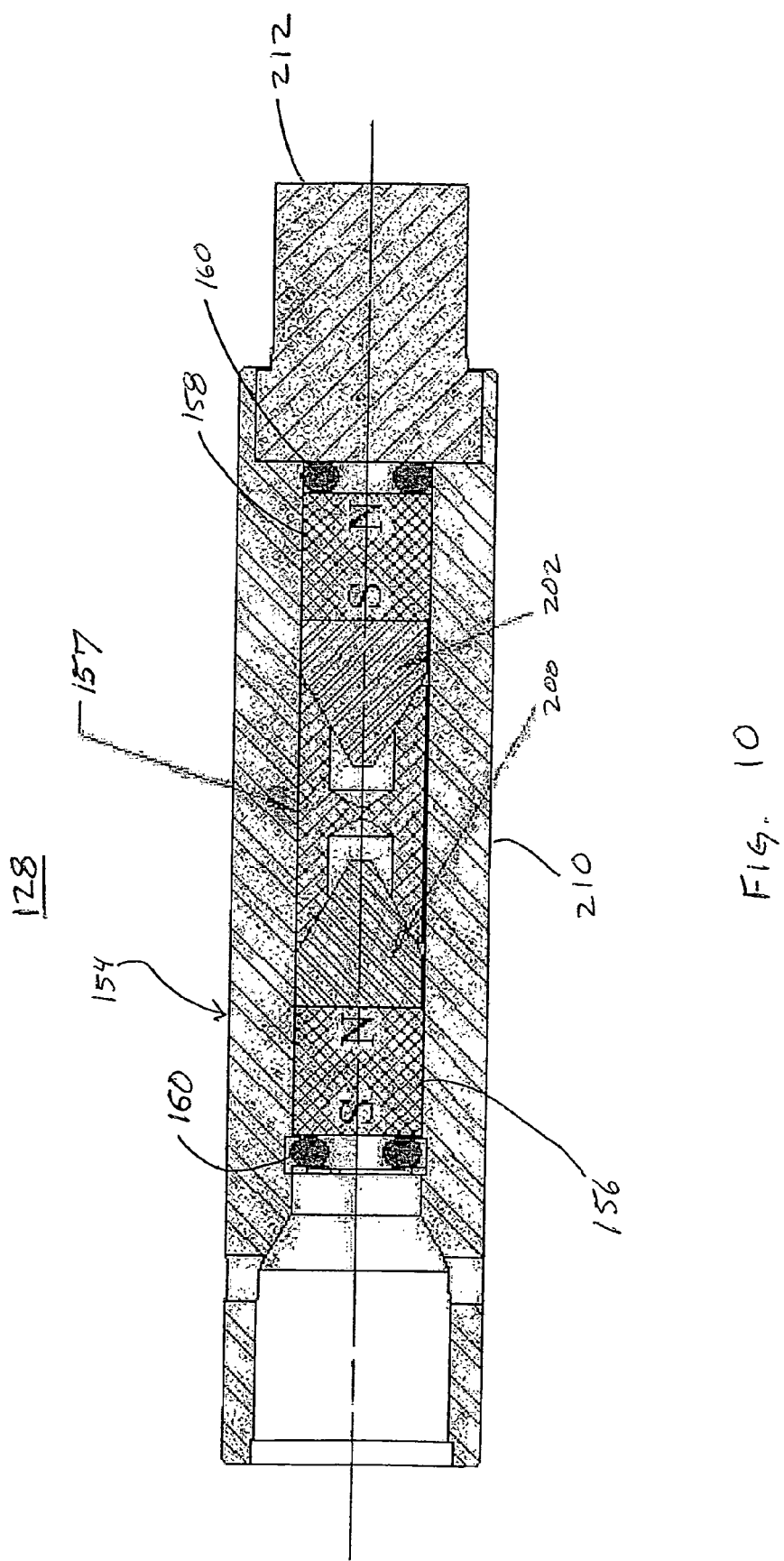
FIG. 10 is a cross section of a magnetic assembly in accordance with another embodiment of the present disclosure.

FIG. 10 illustrates a magnetic assembly 128 in accordance with an other embodiment of the present disclosure comprising a non-magnetic housing 154 defining a passageway extending axially through a portion of the non-magnetic housing. A first magnet 156 is located in a first end of the passageway and a second magnet 158 is located in a second end of the passageway. The first and second magnets 156, 158 may be constructed of a samarium cobalt material or any other suitable material.

The magnets 156 and 158 are separated by a non-magnetic spacer 157 and a pair of magnetic pole pieces 200 and 202 received in the passageway of the non-magnetic housing 154. The magnetic pole pieces 200 and 202 may be constructed of ferrous or any other suitable material, and may be conical in shape. The non-magnetic spacer 157 includes cut-out portions for receivingly engaging the magnetic pole pieces 200 and 202. A pair of retaining rings 160 may be included to hold the first and second magnets 156, 158, the non-magnetic spacer 57 and the magnetic pole pieces 200 and 202 in a fixed position. The non-magnetic spacer 157 and the magnetic pole pieces 200 and 202 may have any other suitable configuration in accordance with other embodiments.

The magnetic pole pieces 200 and 202 concentrate the magnetic field and direct the magnetic field. For example, in the illustrated embodiment, the magnetic pole pieces 200 and 202 may operate to direct the magnetic field to the area of the mechanical movement or stroke of the magnetic assembly 128. Such movement produces a linear magnetic field presented to the magnetic sensor as the valve element 44 moves in either direction.

In the embodiment of FIG. 10, the non-magnetic housing 154 is constructed of two pieces, namely, a body 210 and an end piece 212, which may be bonded together with adhesive or by any other suitable means. The body 210 and end piece 212 may each be constructed of beryllium copper or any other suitable non-magnetic materials such as aluminum, stainless steel, or titanium.

From the foregoing, it will be observed that numerous variations and modifications may be effected without departing from the scope of the novel concept of the present disclosure. It is to be understood that no limitations with respect to the specific methods and apparatus illustrated herein is intended or should be inferred. It is, of course, intended to cover by the appended claims all such modifications as fall within the scope of the claims.

It is claimed:

1. A proportional directional control valve comprising:
a housing having a first portion and a second portion, the first portion having an interior chamber;
an electronic controller mounted within the interior chamber;
at least one solenoid assembly electrically coupled to the electronic controller, the solenoid assembly disposed in the second portion, a drive pin of the solenoid assembly being reciprocally moveable responsive to a current provided by the electronic controller;
a valve assembly disposed in the second portion, the valve assembly comprising a linearly moveable valve element operatively connected to the solenoid assembly, a position of the valve element being responsive to a position of the drive pin;
a magnetic assembly operatively connected to the valve element, the magnetic assembly providing a magnetic field responsive to the position of the valve element, the magnetic assembly including a non-magnetic housing having a passageway extending axially through a portion of the non-magnetic housing, first and second magnets disposed in the passageway, and first and second magnetic pole pieces disposed between the first and second magnets; and
a magnetic positioning sensor assembly coupled to the electronic controller, the magnetic positioning sensor detecting a change in the magnetic field, the magnetic positioning sensor assembly generating an output voltage proportional to the change in the magnetic field.

2. The proportional directional control valve of claim 1 wherein the magnetic pole pieces comprise ferrous material.

3. The proportional directional control valve of claim 1 wherein each of the magnetic pole pieces has a conical configuration.

4. The proportional directional control valve of claim 1 wherein the magnetic assembly further comprises a non-magnetic spacer disposed in the passageway between the first and second magnets and between the first and second magnetic pole pieces.

5. The proportional directional control valve of claim 4 wherein the non-magnetic spacer has a pair of ends, each end defines an opening for receiving a corresponding one of the first and second magnetic pole pieces.

6. The proportional directional control valve of claim 5 wherein each of the magnetic pole pieces has a conical configuration.

7. The proportional directional control valve of claim 1 wherein the non-magnetic housing has a two-piece construction including a body and an end piece.

8. The proportional directional control valve of claim 7 wherein the body and end piece are secured together by an adhesive.

9. The proportional directional control valve of claim 1, wherein the current to the solenoid assembly is adjusted by the electronic controller responsive to a comparison of the output voltage and a command electrical input signal.

10. The proportional directional control valve of claim 9, further comprising a main connector coupled to the electronic controller, the main connector configured to receive electrical power and to provide the electrical power to the electronic controller.

11. The proportional directional control valve of claim 10, wherein the main connecter is further configured to receive the command electrical input signal, the command signal electrical input being processed by the electronic controller to drive the solenoid assembly.

12. The proportional directional control valve of claim 1, wherein the first portion and the second portion are substantially easily separable enabling the first portion to be replaced independently from the second portion and enabling the second portion to be replaced independently from the first portion.

13. The proportional directional control valve of claim 1, wherein the magnetic positioning sensor assembly comprises a linear Hall-effect sensor.

14. The proportional directional control valve of claim 13, wherein the non-magnetic housing comprises a beryllium copper housing, and wherein the first and second magnets comprise a samarium cobalt material.

15. The proportional directional control valve of claim 1, further comprising an operator interface port coupled to the electronic controller to enable values for at least one operating parameter of the proportional directional control valve to be downloaded from a set-up device to the electronic controller.

16. The proportional directional control valve of claim 15, wherein the operator interface port comprises a universal serial bus port.

17. The proportional directional control valve of claim 15, further comprising a removable protective cap disposed on the operator interface port.

18. The proportional directional control valve of claim 15, further comprising a wireless transceiver coupled to the electronic controller to enable values for the at least one operating parameter of the proportional directional control valve to be downloaded from the set-up device to the electronic controller.

19. The proportional directional control valve of claim 1, wherein the electronic controller is mounted to an electronic board in the interior chamber, and wherein the proportional directional control valve further includes an electronic potting material disposed on the electronic board, the electronic potting material providing a protective barrier for the electronic board.

20. A proportional directional control valve comprising:
a valve operating mechanism that permits communication between a first channel and a second channel through a linear motion of a valve element of the valve operating mechanism;
a magnetic assembly operatively connected to the valve element, the magnetic assembly including a non-magnetic housing having a passageway extending axially through a portion of the non-magnetic housing, first and second magnets disposed in the passageway, and first and second magnetic pole pieces disposed between the first and second magnets;
a magnetic positioning sensor assembly that senses a magnetic field resulting from the magnetic assembly; and
a control system controlling a linear movement of the valve element in response to an electrical signal generated by the magnetic positioning sensor.

21. The proportional directional control valve of claim 20 wherein the magnetic pole pieces comprise ferrous material.

22. The proportional directional control valve of claim 20 wherein the magnetic assembly further comprises a non-magnetic spacer disposed in the passageway between the first and second magnets.

23. The proportional directional control valve of claim 20 wherein the non-magnetic housing has a two-piece construction including a body and an end piece.

24. The proportional directional control valve of claim 20, wherein the valve operating mechanism further comprises at least one solenoid assembly electrically coupled to the control system, a drive pin of the solenoid assembly being reciprocally moveable responsive to a current provided by the control system.

25. The proportional directional control valve of claim 24, wherein the control system comprises:
a micro-controller mounted within an interior chamber of a first portion of a housing of the proportional directional control valve;
a operator interface port coupled to the micro-controller; and
a set-up device communicatively coupled to the operator interface port.

* * * * *